United States Patent
Stoll (10) Patent No.: US 7,271,752 B2
(45) Date of Patent: Sep. 18, 2007

(54) ARRANGEMENT FOR THE OPERATION OF FIELD DEVICES OF AN ADMINISTRATION AND MAINTENANCE UNIT OF A BUILDING

(75) Inventor: Walter Stoll, Sattel (CH)

(73) Assignee: Siemens Building Technologies AG, Zurich (CH)

( * ) Notice: Subject to any disclaimer, the term of this patent is extended or adjusted under 35 U.S.C. 154(b) by 568 days.

(21) Appl. No.: 10/896,765

(22) Filed: Jul. 21, 2004

(65) Prior Publication Data
US 2005/0070177 A1 Mar. 31, 2005

Related U.S. Application Data

(60) Provisional application No. 60/494,407, filed on Aug. 12, 2003.

(30) Foreign Application Priority Data
Jul. 21, 2003 (EP) .................................. 03016415

(51) Int. Cl.
*H03M 1/00* (2006.01)
(52) U.S. Cl. ........................................ 341/126; 700/75
(58) Field of Classification Search ................ 341/126; 700/75, 291, 275, 286, 297
See application file for complete search history.

(56) References Cited
U.S. PATENT DOCUMENTS
4,872,213 A * 10/1989 Sebald et al. .................. 700/75

\* cited by examiner

Primary Examiner—Rexford Barnie
Assistant Examiner—Joseph Lauture
(74) Attorney, Agent, or Firm—Maginot, Moore & Beck (57) ABSTRACT

An interface component (10) for a universal in-/output module with connection points (X0, M) for field devices includes an analog-to-digital converter (ADC), a digital-to-analog converter (DCA), a power source (25) and a combinational circuit, through which, as required, the analog-to-digital converter (ADC), the digital-to-analog converter (DAC) or the power source (25) are each able to be automatically connected to connection points of the interface component (10). The interface component (10) is able to be connected via a microcomputer to a digital data bus of a control and/or regulation device. A connection point (X0, M) for a field device includes a terminal (X0) able to be configured via the interface component (10) for the field device as an input and/or as an output for bidirectional signals. The terminal (X0) is connected via a first ohmic resistor (Ri) to a first connection point (IOX01) of the interface component (10) and via a second ohmic resistor (Ro) to a second connection point (IOX00) of the interface component (10), the first connection point (IOX01) being able to be connected via the combinational circuit to the input of the analog-to-digital converter (ADC) and the second connection point (IOX00) via the combinational circuit to the power source (25). The two ohmic resistors (Ro, Ri) are not implemented in the interface component (10). Through the two resistors, the interface component that is able to be used for sensors and/or servo elements is able, independently of the current configuration of the terminal (X0), to be largely protected against instances of incorrect wiring without a signal recording or signal generation at the universally usable terminal (X0) being impermissibly changed.

17 Claims, 9 Drawing Sheets

ARRANGEMENT FOR THE OPERATION OF FIELD DEVICES OF AN ADMINISTRATION AND MAINTENANCE UNIT OF A BUILDING

BACKGROUND OF THE INVENTION

1. Field of the Invention

The invention relates to an arrangement with an interface component and with connection points for field devices.

2. Description of the Prior Art

Such arrangements are suitable for example for the inputting of signals from field devices in an apparatus for the monitoring, control and regulation of an administration and maintenance unit of a building and for the issuing of signals to field devices of the said apparatus.

The administration and maintenance unit is for example a heating, ventilation and air-conditioning unit, with access and fire-monitoring equipment or generally a building automation unit or a building management system. In particular, room-climate variables such as room temperature, air humidity and air quality are also influenced by the administration and maintenance unit. In the administration and maintenance unit, a large number of so-called field devices such as sensors and servo elements are to be operated by electric signals, during which process—depending on the nature of a field device—electric signals are outputted to the field device and/or electric signals are inputted from the field device.

An interface component of an arrangement is known from U.S. Pat. No. 4,872,213. When using the known interface component in a unit the interface component can possibly be destroyed if connection terminals are incorrectly wired.

SUMMARY OF THE INVENTION

The object of the invention is to provide an arrangement with an interface component that is able to be configured universally for servo elements or sensors, in which the interface component is not destroyed even if connection terminals are incorrectly wired.

The present invention provides an arrangement comprising an interface component and connection points for field devices, wherein:

the interface component includes an analog-to-digital converter, a digital-to-analog converter, a power source and a combinational circuit, through which, as required, the analog-to-digital converter, the digital-to-analog converter or the power source are each able to be automatically connected to connection points of the interface component;

the interface component is able to be connected via a microcomputer to a digital data bus of a control and/or regulation device and a connection point for a field device containing a terminal, able to be configured via the interface component for the field device as an input and/or as an output, for bidirectional signals;

the terminal is connected via a first ohmic resistor to a first connection point of the interface component and in that the terminal is connected via a second ohmic resistor to a second connection point of the interface component; and the first connection point is able to be connected via the combinational circuit to the input of the analog-to-digital converter and the second connection point via the combinational circuit to the power source, and the two ohmic resistors are not implemented in the interface component.

Preferred designs are described in the dependent claims.

BRIEF DESCRIPTION OF THE DRAWINGS

Embodiments of the invention are explained in more detail below with the help of the drawings.

DESCRIPTION OF THE PREFERRED EMBODIMENTS

Figure 1:
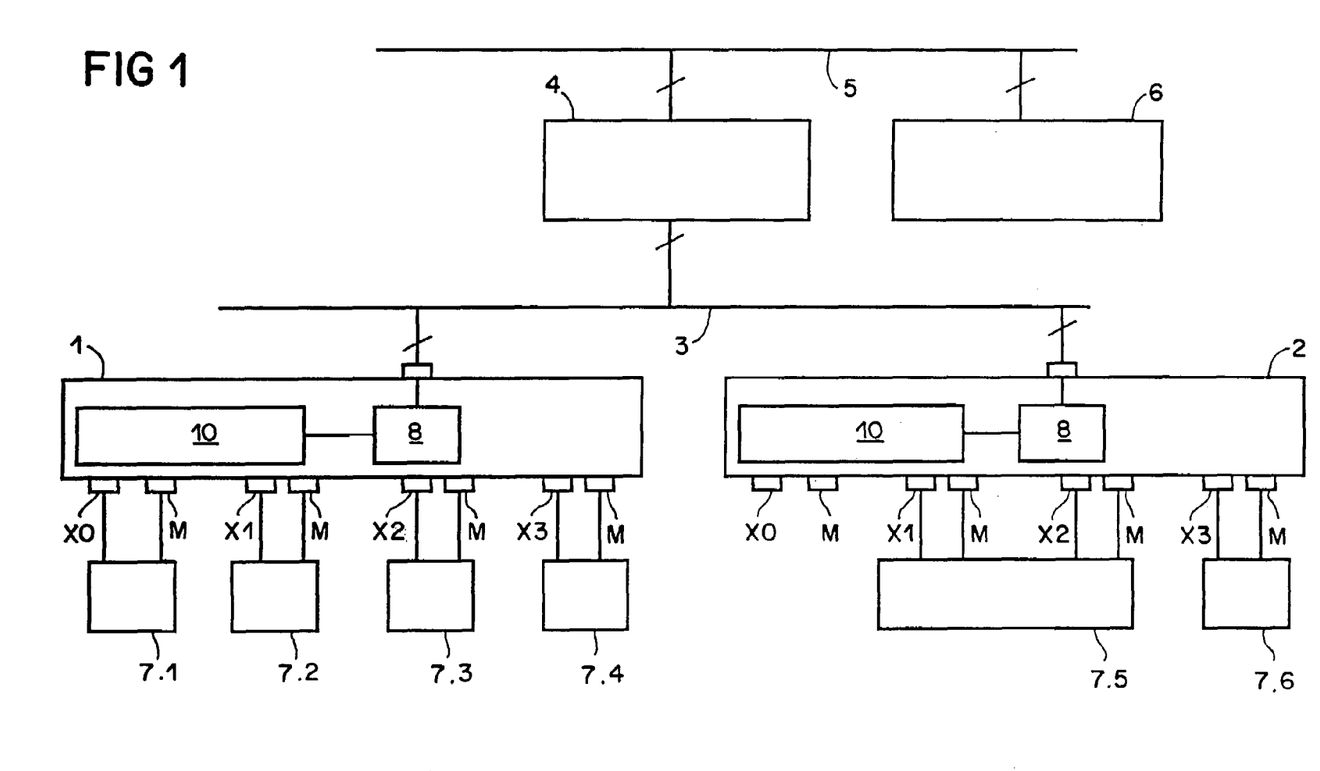
FIG. 1 is a block diagram of a part of an administration and maintenance unit with field devices.

In FIG. 1, 1 stands for a first and 2 for a second universal in-/output module. The two in-/output modules 1 and 2 are connected by way of example via a bus system 3 to a control and regulation device 4. The control and regulation device 4 is typically connected via a further bus system 5 to a superordinated module 6.

The universal in-/output module 1 or else 2 serves to operate field devices, a field device generally being a sensor for recording a process variable or a servo drive for influencing a process variable.

The in-/output module 1 or else 2 has several terminals X0, X1, X2 and X3 for the connection of field devices. In principle the number of field devices able to be connected per in-/output module 1 or else 2 can be chosen within wide limits and matched to allowable module costs, space requirement and to the expected data flow per time unit. For building automation units, eight or sixteen connection points per in-/output module 1, 2 are advantageously realized.

A connection point has a terminal X0, X1, X2 or X3 and advantageously a further terminal M each for the signal reference point. The terminals M for the signal reference point are advantageously connected to each other inside the in-/output module 1 or 2.

In principle, it would also be possible, for the in-/output module 1 or 2, to provide only a single multiple terminal for the signal reference point of all field devices.

The terminals X0, X1, X2 and X3 are basically constructed and wired in the same way and are able to be used universally as an input port and an output port, thus for bidirectional signal flow, both for analog signals and for digital signals. The universal terminals X0, X1, X2 or X3 are thus able to be used in principle for a large number of field device types, for sensors or actuators, thus for field devices with analog input, analog output, digital input or digital output. If required, a field device 7 is connected to several terminals X0, X1, X2 or X3, for example when the field device 7 is a servo element with position reporting, an adjustment signal then being outputted for example at one terminal and a status or the current position of the servo element being read in simultaneously at a further terminal.

The universal terminal X0, X1, X2 or X3, like the further terminal M, is advantageously realized as a spring terminal. It is self-evident that the terminal X0, X1, X2 or X3 or M can in principle, if required, also be realized as a screw-type terminal or for example as a plug or plug element.

The in-/output modules 1 and 2 include at least one microcomputer 8 each and one interface component 10 each, connected to the microcomputer 8, through which the universal terminals X0, X1, X2 and X3 are able to be configured for a specific task and operated accordingly. The in-/output module 1 or 2 is advantageously connected via the microcomputer 8 to the bus system 3 for a data communication with the control and regulation device 4. In a variant of the in-/output module 1 or 2 the microcomputer 8 is implemented in the interface component 10. According to the invention the interface component 10 has external circuitry which advantageously is provided in the corresponding in-/output module 1 or 2 preferably on a printed circuit board.

In order to produce large numbers of items at favorable cost and also achieve a high reliability and operational safety, the interface component 10 is advantageously realized as a so-called application-specific integrated circuit (ASIC).

Connected by way of example to universal terminals are: a passive sensor 7.1, an active sensor 7.2, a potential-free switch 7.3, a voltage-controlled servo element 7.4, a current-controlled servo element 7.5 including a position reporter and a further field device 7.6.

Figure 2:
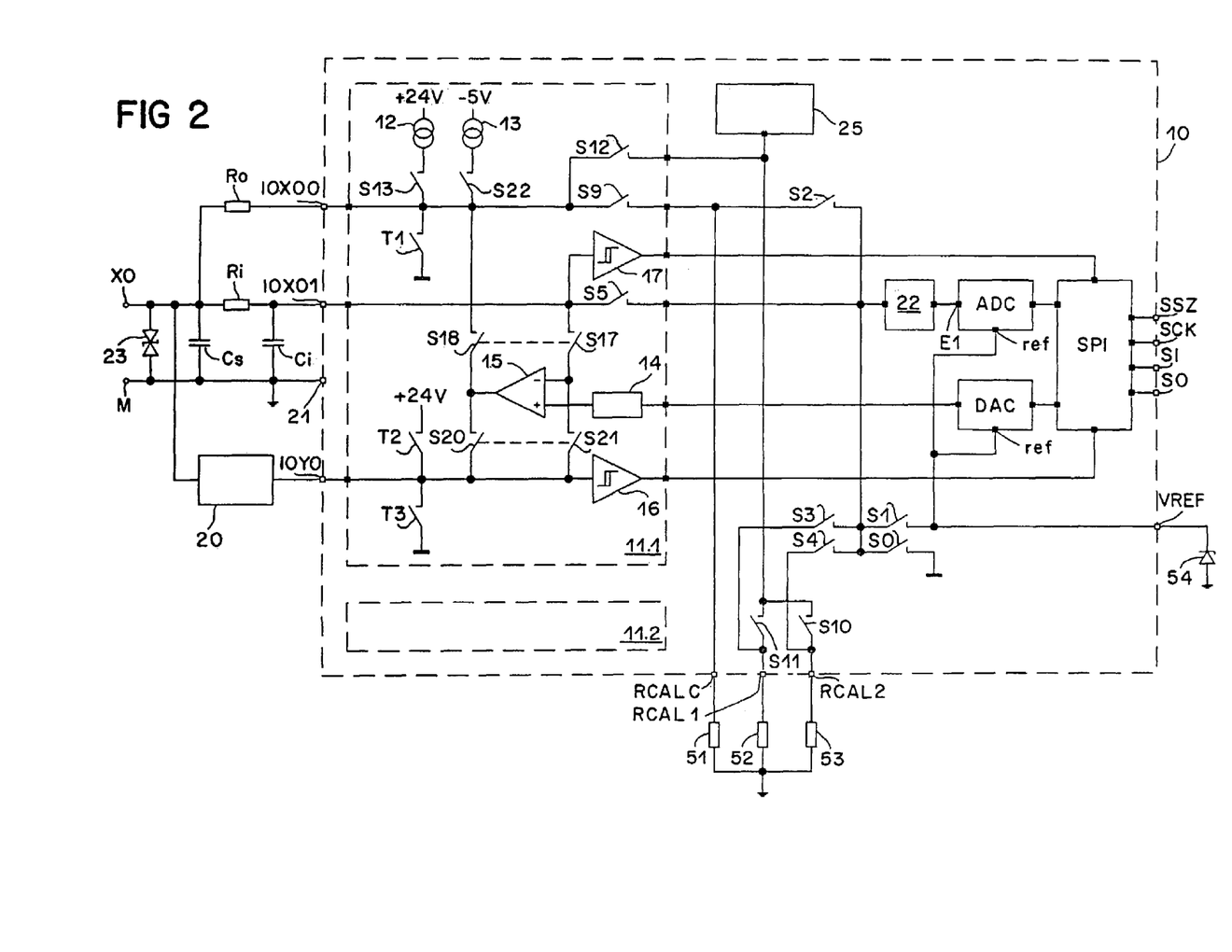
FIG. 2 is a universal interface component for field devices, with external circuitry according to the present invention.

A block diagram of the interface component 10 and also an advantageous external circuitry of the interface component 10 are represented in FIG. 2. For reasons of clarity only those function blocks of the interface component 10 which contribute to an understanding of the invention are represented.

The interface component 10 has several—typically eight—identically structured channels of which, for the sake of simplicity, only a first channel 11.1 has been represented in detail framed in dotted lines. In addition, a second channel 11.2 is represented only by a further dotted-line frame.

Although the interface component 10 thus includes several channels, in the following the mode of operation of one such channel will be described for the sake of simplicity— and representing the further channels of the interface component 10—with reference to channel 11.1 only.

The channel 11.1 advantageously has a first power source 12, a second power source 13, a so-called sample-and-hold element 14, an output amplifier 15 connected on the input side to the sample-and-hold element 14, a first comparator 16, a second comparator 17 and a part combinational circuit consisting of several switches S and T.

Per channel 11.1 and 11.2 respectively, the interface component 10 includes at least a first connection point IOX01 connected to a first ohmic resistor Ri and a second connection point IOX00 connected to a second ohmic resistor Ro.

In an advantageous variant, a further voltage-to-current converter 20 is also provided outside the interface component 10 per channel 11.1 and 11.2 respectively. The voltage-to-current converter 20 is connected on the input side to a third connection point IOY0 of the corresponding channel 11.1 and on the output side to the first terminal X0 allocated to the corresponding channel 11.1

The interface component 10 also includes at least a fourth connection point 21 for the signal reference point. The fourth connection point 21 is connected to the terminal M.

The two ohmic resistors Ri and Ro and also the voltage-to-current converter 20 are advantageously not integrated in the interface component 10, but arranged outside the interface component 10. The terminal X0 allocated to the channel 11.1 is connected to the first connection point IOX01 via the first ohmic resistor Ri and to the second connection point IOX00 of the channel 11.1 via the second ohmic resistor Ro.

The first connection point IOX01 is led via controllable switches S of the combinational circuit to the input E1 of an analog-to-digital converter ADC, an advantageously program-controlled scaling apparatus 22 being connected upstream from the analog-to-digital converter ADC if required.

The second connection point IOX00 can be connected via controllable switches S of the combinational circuit to a power source of the interface component 10.

A semiconductor overvoltage protection device 23 is advantageously connected between the terminal X0 and the terminal M provided for the signal reference point, the semiconductor overvoltage protection device 23 advantageously not being integrated in the interface component 10 and being matched to inadmissibly high voltages or interference voltage peaks.

If required, a capacitor Cs is also connected between the terminal X0 and the terminal M provided for the signal reference point, the capacitor Cs advantageously not being integrated in the interface component 10. Furthermore, if required a further capacitor Ci is connected between the first connection point IOX01 and the terminal M provided for the signal reference point, the capacitor Ci advantageously also not being integrated in the interface component 10.

A combinational circuit, built up from numerous switches S and T advantageously controllable by the microcomputer 8 via suitable commands, of the interface component 10 comprises on the one hand the part combinational circuits allocated to the individual channels 11.1 and 11.2 and a further part combinational circuit which serves to operate all the channels 11 jointly.

For the advantageously joint operation of all the channels 11, in addition to the analog-to-digital converter ADC, a digital-to-analog converter DAC and a programmable power source 25 are also provided in the interface component 10. The channels 11 are correspondingly operated in multiplex mode and connected by the combinational circuit, as the situation requires, to the analog-to-digital converter ADC, the digital-to-analog converter DAC or the programmable power source 25.

For the digital data communication between the interface component 10 and the microprocessor 8 (FIG. 1), the interface component 10 includes by way of example a standardized serial-peripheral interface SPI through which the number of the necessary connection points of the interface component 10 can also be kept as small as possible. The digital-to-analog converter DAC is connected to the SPI on the input side, and the analog-to-digital converter ADC on the output side.

The advantageous input circuitry, described above and represented in FIG. 2, in which the first terminal X0 is led on the one hand via the first ohmic resistor Ri to the first connection point IOX01 and the first terminal X0 on the other via the second ohmic resistor Ro to the second connection point IOX00 permits, given appropriate dimensioning, a secure and highly accurate operation of the most varied field devices. In particular, a large part of the field devices used in building management is able to be operated with it.

For the calibration of signals at the first terminal X0, ohmic calibrating resistors are provided which are used via controlled switches S of the combinational circuit and which advantageously are arranged outside the interface component 10 in the in-/output module 1 or 2.

In an advantageous embodiment of the interface component 10 the interface component 10 includes a fourth connection point RCALC, a fifth connection point RCAL1, a sixth connection point RCAL2 and a seventh connection point VREF, the fourth connection point RCALC being connected to a measuring resistor 51, the fifth connection point RCAL1 to a first calibrating resistor 52, the sixth connection point RCAL2 to a second calibrating resistor 53 and a seventh connection point VREF to a voltage reference element 54.

The seventh connection point VREF is connected to a reference input ref of the analog-to-digital converter ADC, to a reference input ref of the digital-to-analog converter DAC and to the combinational circuit of the interface component 10.

A calibration, linearization and scaling of an analog signal is essentially controlled by the microcomputer 8 connected to the interface component 10 via the combinational circuit of the interface component 10, the microcomputer 8 also carrying out necessary calculations. The characteristic of a field device—for example a non-linearity—is advantageously compensated with the help of the microcomputer 8. The mirocomputer 8 is of course in principle also able to be implemented by an arrangement with a microprocessor together with memory and communication components. In principle, the microcomputer 8 and the interface component 10 could also be realized in a single sub-assembly. If required, the interface component 10 has available a run-off control, not represented in the drawing, for the interpretation of certain instructions transferred by the microcomputer 8 to the interface component 10.

Figure 3:
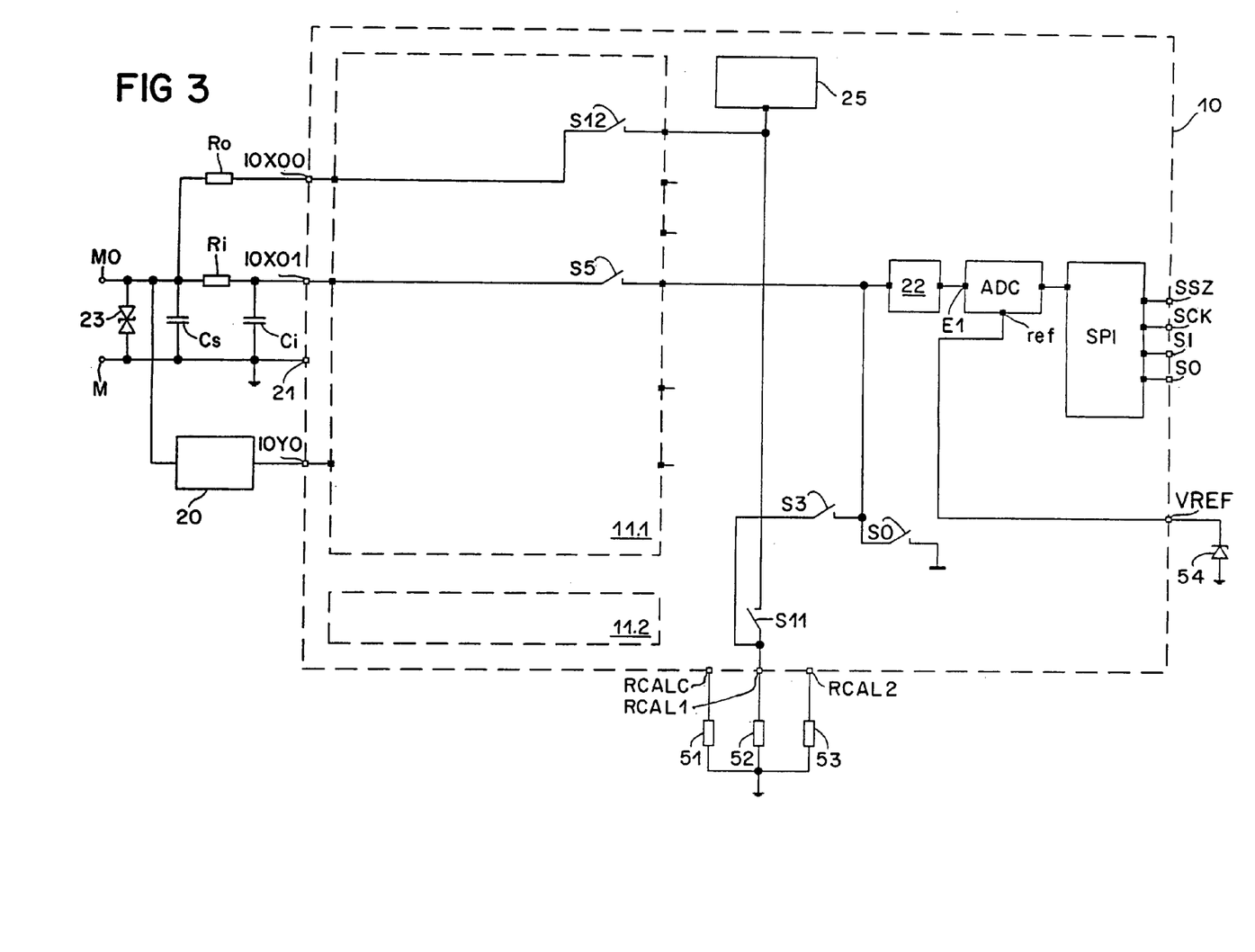
FIG. 3 is the external circuitry, plus important function blocks of the interface component for the operation of a passive sensor of a certain class.

FIG. 3 shows important switches S12, S6, S11, S3 and S0 of the combinational circuit if a passive sensor with relatively linear characteristics is connected between the first terminal X0 and the further terminal M. The passive sensor is by way of example a temperature probe made of nickel or platinum. A temperature measurement takes place indirectly via the resistance value of the temperature probe, from which the temperature is calculated taking account of the characteristics of the temperature probe. The resistance value of the temperature probe is advantageously ascertained by comparing a voltage lying over the temperature probe and a voltage lying over the first calibrating resistor 52, the temperature probe and the first calibrating resistor 52 being in contact on one side with the signal reference point and having currents of equal size flowing through them.

By closing a first switch S11, the programmable power source 25 is connected to the first calibrating resistor 52, and by closing a second switch S3 the voltage lying over the first calibrating resistor 52 is led via the scaling apparatus 22 to the input E1 of the analog-to-digital converter ADC in order to be recorded.

By closing a third switch S12, the programmable power source 25 is connected via the second ohmic resistor Ro to the temperature probe, and by closing a fourth switch S5 the voltage lying over the temperature probe is led via the scaling apparatus 22 to the input E1 of the analog-to-digital converter ADC in order to be recorded.

By closing a fifth switch S0, the input E1 of the analog-to-digital converter ADC is connected to the signal reference point, as a result of which a zero-point compensation is made possible.

If the passive sensor has a rated value of 1000 ohms, good results can be achieved with the proposed circuit if the rated value of the first calibrating resistor 52 is roughly 2.4 kohms.

Figure 4:
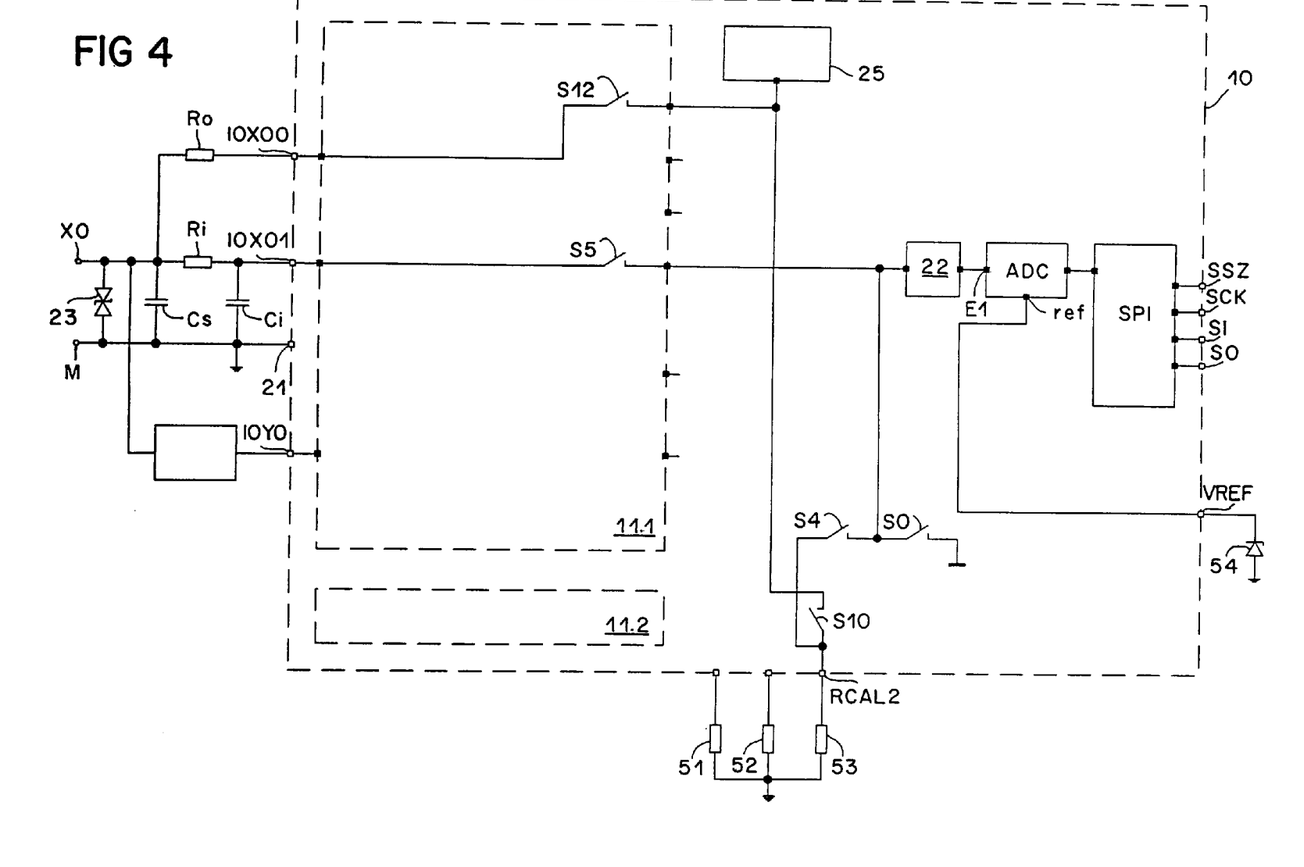
FIG. 4 is the external circuitry, plus important function blocks of the interface component for the operation of a passive sensor of a further class.

FIG. 4 shows important switches S12, S5, S10, S4 and S0 of the combinational circuit if a passive sensor with markedly non-linear characteristics is connected between the first terminal X0 and the further terminal M. The passive sensor is by way of example a so-called NTC sensor, i.e. a semiconductor temperature probe with a negative temperature coefficient. A temperature measurement takes place indirectly via the resistance value of the temperature probe, from which the temperature is calculated taking account of the known characteristics of the temperature probe. The characteristics of the temperature probe connected parallel to the second calibrating resistor 53 are advantageously recorded and fixed. The resistance value of the temperature probe is ascertained by comparing a voltage lying over the second calibrating resistor 53 and a voltage lying over the parallel circuit of the temperature probe and of the second calibrating resistor 53, the temperature probe and the second calibrating resistor 53 being in contact on one side with the signal reference point and the same power source being used for the measurements.

By closing a sixth switch S10, the programmable power source 25 is connected to the second calibrating resistor 53, and by closing a seventh switch S4 the voltage lying over the second calibrating resistor 53 is led via the scaling apparatus 22 to the input E1 of the analog-to-digital converter ADC in order to be recorded.

By closing the third switch S12 when the sixth switch S10 is closed, the programmable power source 25 is connected to the second calibrating resistor 53 and via the second ohmic resistor Ro to the temperature probe, and by closing the fourth switch S5 when the seventh switch S4 is open the voltage lying over the temperature sensor is led via the scaling apparatus 22 to the input E1 of the analog-to-digital converter ADC in order to be recorded.

By closing the fifth switch S0 the input E1 of the analog-to-digital converter ADC is connected to the signal reference point, as a result of which a zero-point compensation is made possible.

If the passive sensor has a resistance value between 10 kohms and 100 kohms at 25° C., good results can be achieved with the proposed circuit if the rated value of the second calibrating resistor 53 is roughly 33 kohms.

Figure 5:
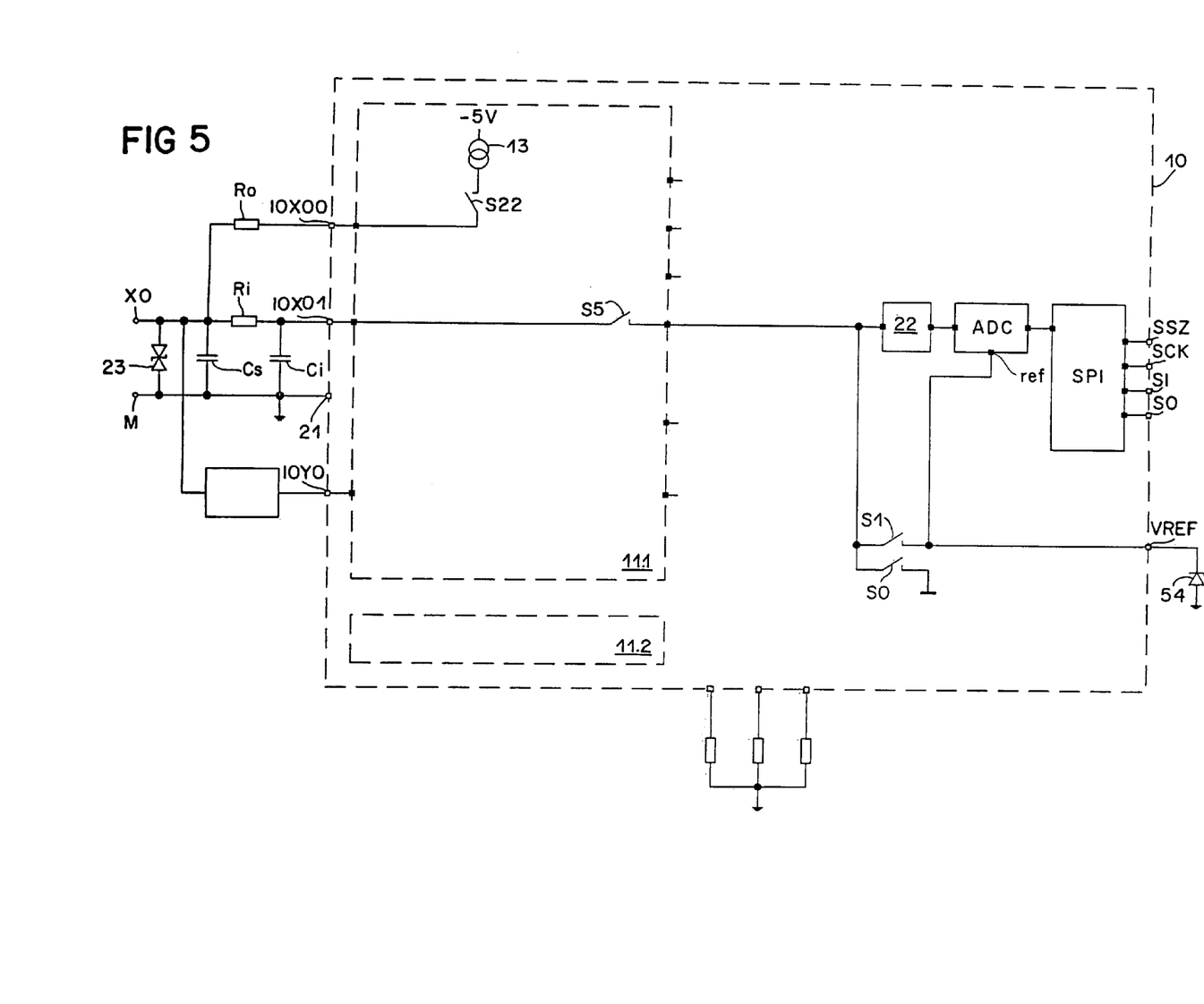
FIG. 5 is the external circuitry, plus important function blocks of the interface component for the operation of an active sensor of a certain class.

FIG. 5 shows important switches S5, S22, S1 and S0 of the combinational circuit if an active sensor—delivering an electric voltage—is connected between the first terminal X0 and the further terminal M. The active sensor is by way of example a voltage transmitter which delivers a signal in the range between 0 V and 10 V.

For a comparison or calibration measurement, the voltage reference element 54 is connected to the input E1 of the analog-to-digital converter ADC by closing an eighth switch S1. A zero-point compensation is made possible, when the fourth switch S5 is open and the eighth switch S1 is open, by closing the fifth switch S0.

By closing the fourth switch S5 a signal of the active sensor is connected via the scaling apparatus 22 to the input E1 of the analog-to-digital converter ADC.

By closing a ninth switch S22, the second power source 13 is connected to the second connection point IOX00. The second power source 13 is poled and laid out such that for example if a sensor is missing the voltage at the first connection point IOX01 drops beneath zero volts, with the result that a simple wiring test is made possible.

Figure 6:
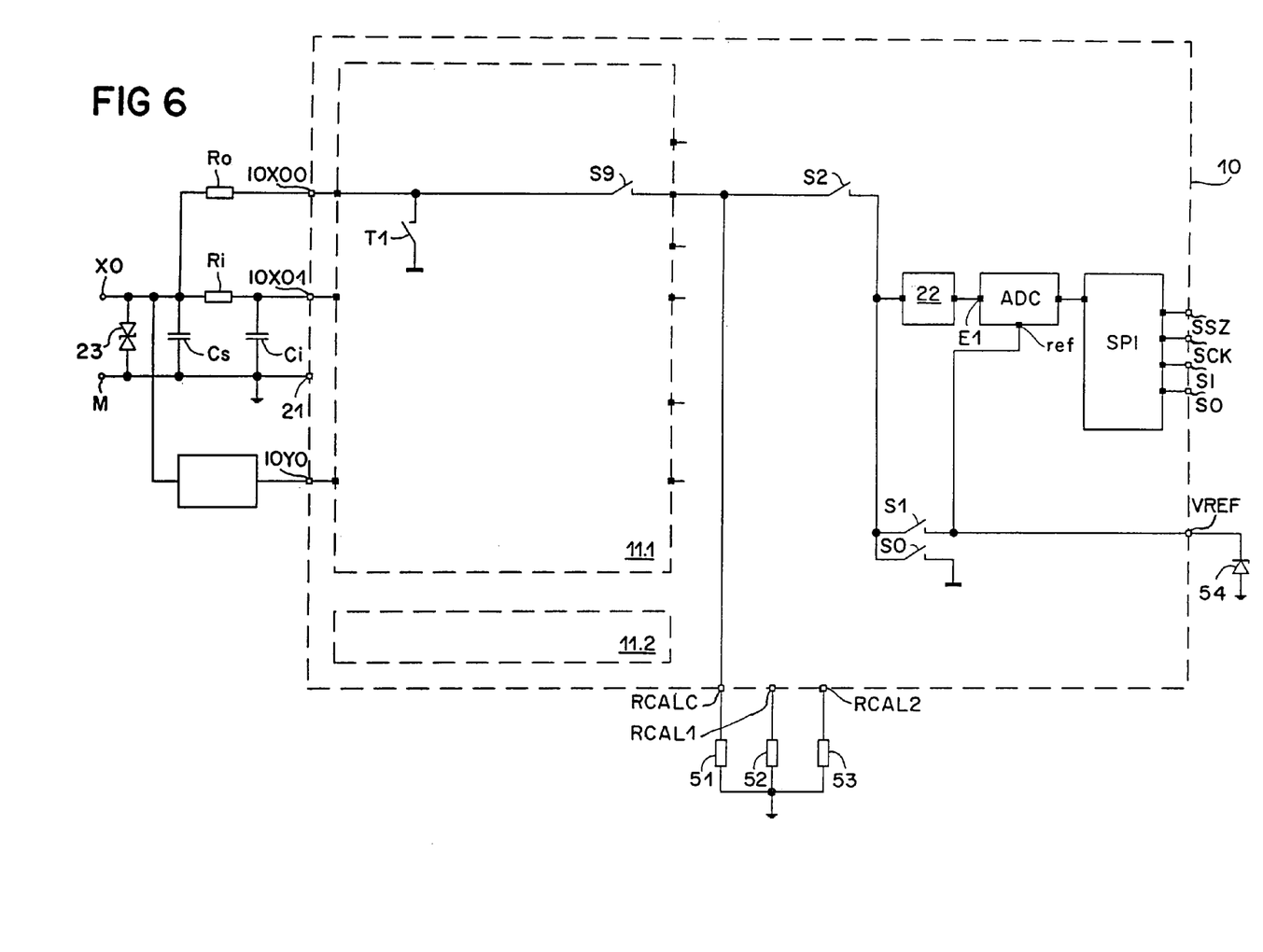
FIG. 6 is the external circuitry, plus important function blocks of the interface component for the operation of an active sensor of a further class.

FIG. 6 shows important switches T1, S9, S2, S1 and S0 of the combinational circuit if the field device connected at the first terminal X0 is an active sensor—delivering an electric current. The active sensor delivers by way of example a current in the range from 4 mA to 20 mA.

The second connection point IOX00 can be connected via a tenth switch T1 to the signal reference point and via an eleventh switch S9 to the fourth connection point RCALC and a twelfth switch S2, the twelfth switch S2 being connected via the scaling apparatus 22 to the input E1 of the analog-to-digital converter ADC.

The current delivered from the connected field device is ascertained by recording a voltage drop over the measuring resistor 51 connected to the fourth connection point RCALC. By closing the eleventh switch S9 and the twelfth switch S2, the voltage dropping at the measuring resistor 51 is recorded by the ADC. For a comparison or calibration measurement, the voltage reference element 54 is connected to the input E1 of the analog-to-digital converter ADC by closing the eighth switch S1. A zero-point compensation is made possible, when the twelfth switch S2 is open and the eighth switch S1 is open, by closing the fifth switch S0.

Outside a measuring cycle the output of the connected field device can if required be connected via the tenth switch T1 via the second ohmic resistor Ro to the signal reference point, with the result that the output of the field device never remains open.

Figure 7:
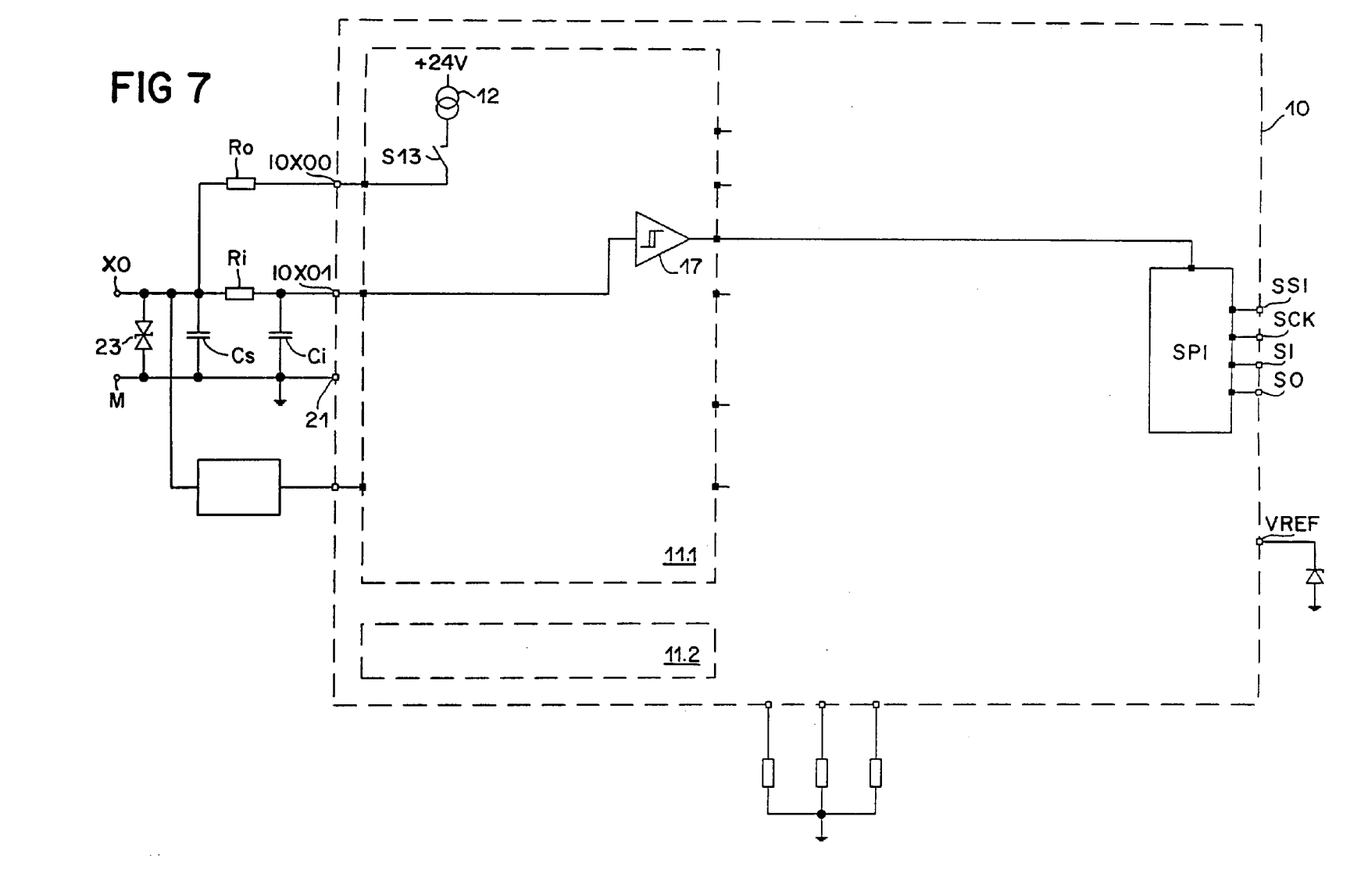
FIG. 7 is the external circuitry, plus important function blocks of the interface component for the recording of the status of a switch.

FIG. 7 shows a diagram for recording the status of a mechanical or electronic switch connected between the first terminal X0 and the further terminal M. The first power source 12 is connected via a thirteenth switch S13 of the combinational circuit to the second connection point IOX00. The second comparator 17 is connected on the input side to the first connection point IOX00 and on the output side to the serial-peripheral interface SPI. If the first power source 12 is connected to the first connection point IOX00 the result, because of the ohmic resistor Ro on the one hand when the switch is closed on the input side, is a low voltage potential, and on the other hand when the switch is open a high voltage potential which is unambiguously recorded by the second comparator 17 and is transmitted as a binary signal to the serial-peripheral interface SPI.

Figure 8:
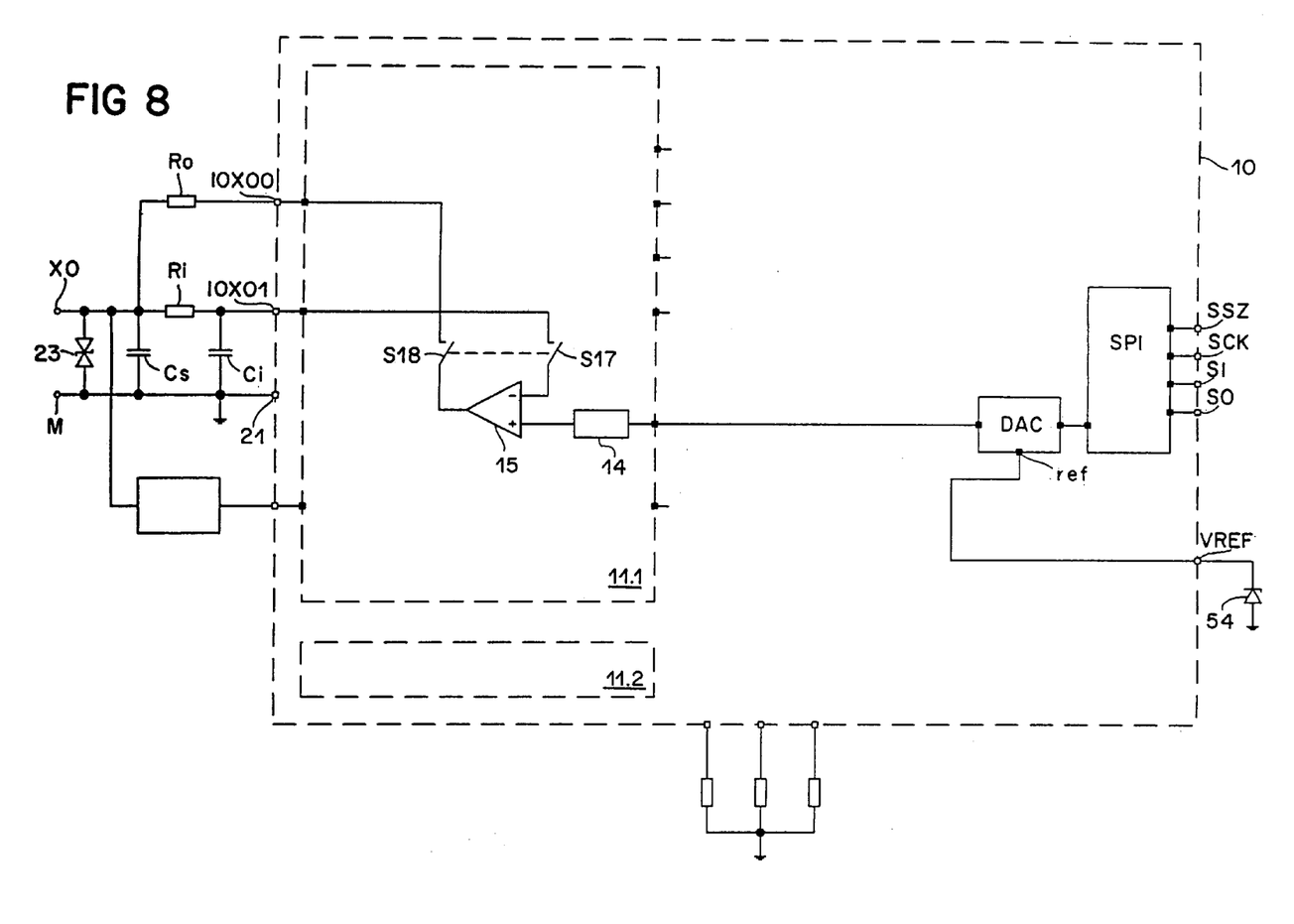
FIG. 8 is the external circuitry, plus important function blocks of the interface component for the operation of a voltage-controlled servo element.
Figure 9:
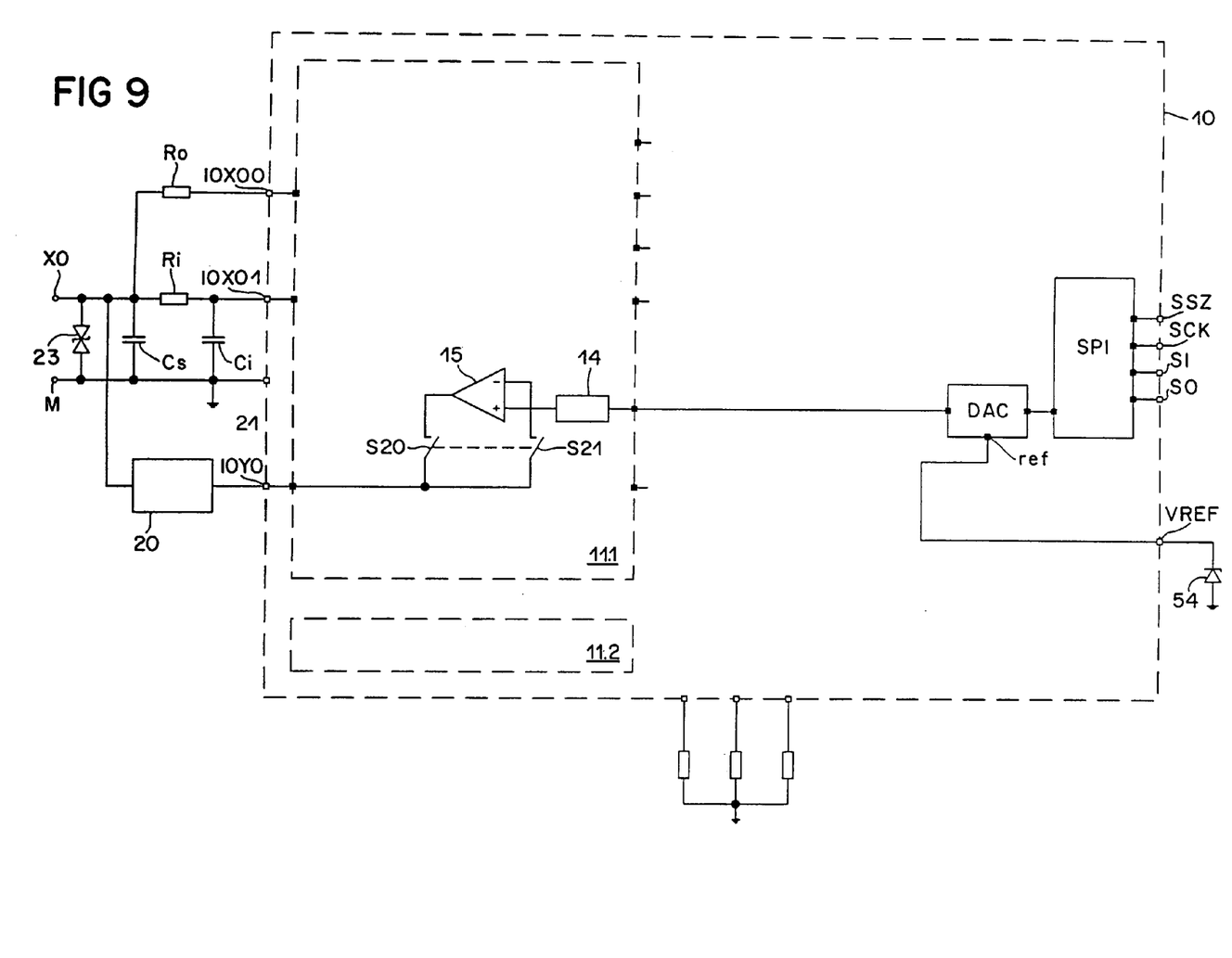
FIG. 9 is the external circuitry, plus important function blocks of the interface component for the operation of a current-controlled servo element.

The field device connected in FIG. 8 between the first terminal X0 and the further terminal M is a voltage-controlled servo element which is to be driven by way of example in a range from 0 V to 10 V. The digital-to-analog converter DAC is connected on the output side to the sample-and-hold element 14. The sample-and-hold element 14 is led to the non-inverting input of an output amplifier 15, implemented by an operation amplifier, which is led on the output side via a fourteenth switch S18 of the combinational circuit to the second connection point IOX00. The first connection point IOX01 is connected via a fifteenth switch 17 of the combinational circuit to the inverting input of the output amplifier 15. The field device connected in FIG. 9 between the first terminal X0 and the further terminal M is a current-controlled servo element which is to be driven by way of example in a range from 4 mA to 20 mA. The digital-to-analog converter DAC is connected on the output side to the sample-and-hold element 14. The sample-and-hold element 14 is led to the non-inverting input of the output amplifier 15, implemented by the operation amplifier, which is led on the output side via a sixteenth switch S20 of the combinational circuit to the third connection point IOY0. The third connection point IOY0 is connected via a seventeenth switch 21 of the combinational circuit to the inverting input of the output amplifier 15. The voltage-to-current converter 20 is thus, when the sixteenth and seventeenth switches S20 and S21 are closed, driven via the operation amplifier connected as a voltage follower. Because the voltage-to-current converter 20 is arranged outside the interface component 10, the heating of the interface component 10 can be kept to a minimum, although relatively large output currents are still able to be generated at the first terminal X0.

The channel 11.1 advantageously also includes two series-connected switches T2 and T3, an eighteenth switch T2 being in contact on one side with a supply voltage and a nineteenth switch T3 on one side with the signal reference point. The third connection point IOY0 is connected to the joint potential of the two switches T2 and T3 and to the input of the first comparator 16 (FIG. 2) which on the output side is typically led to the serial-peripheral interface SPI.

In an advantageous variant of the in-/output module 1 or 2, in which the voltage-to-current converter 20 is not connected to the third connection point IOY0, the third connection point IOY0 can be used, through suitable driving of the two switches T2 and T3, as a digital output through which for example a relay is able to be driven. In addition, the third connection point IOY0 can be used—if the two switches T2 and T3 are kept highly resistive—as a digital input, the signal of which is passed on by the first comparator 16 to the serial-peripheral interface SPI.

The values of the components arranged in the in-/output modules outside the interface component 10 are to be matched to each other, in order that in particular the first ohmic resistor Ri and the second ohmic resistor Ro can assume protective functions for the interface component 10 without adversely affecting the necessary accuracy of the signal recording and signal generation by the interface component.

In the case of the following concrete numerical values it is assumed that the highest voltage value that is to be expected in the case of any incorrect wiring and against which the interface component 10 is to be protected is 24V+20% alternating-current voltage. Furthermore, the components arranged outside the interface component 10 are to be arranged using the so-called SMD (Surface Mounted Device) technique and the interface component 10 housed in a customary plastic housing.

The second ohmic resistance Ro must not be less than roughly 390 ohms, as otherwise in a case of incorrect wiring with 24-V alternating-current voltage the interface component 10 and the second resistor Ro could be destroyed.

In as much as the complete configurability of the interface component 10 is to be utilized, the second ohmic resistance Ro must not be greater than 390 ohms. This limit is the result of a maximum permitted load of roughly 500 ohms for a current input when the measuring resistor 51, via which the analog-to-digital converter ADC records the voltage, is 47 ohms. In the configuration as a current input, a current flows through the second ohmic resistance Ro, via the eleventh switch S9 and through the measuring resistor 51.

In as much as the configurability of the first terminal X0 as a current input is dispensed with, the second ohmic resistance Ro can also be chosen to be greater. The maximum value is then roughly 1500 ohms. Conditions which obtain when the first terminal X0 is configured as a voltage output have a limiting effect. At maximum load the voltage drop over the second ohmic resistance Ro must be only great enough for the whole range—by way of example 0 to 10 V—to be able to be controlled. Furthermore, the stability at maximum capacitive load, typically at 230 nF, must be guaranteed. Too great a second resistance Ro would mean poorer stability behaviour.

The first ohmic resistance Ri should be as large as possible, in order that only a small current flows in the case of incorrect wiring. However, input leakage currents flowing in the first connection point IOX01 must not generate a noticeable voltage drop over the first ohmic resistor Ri.

The semiconductor overvoltage protection device 23, the capacitor Cs and the further capacitor Ci are able to be used in order to make the configurable first terminal X0 electromagnetically compatible. The threshold voltage of the semiconductor overvoltage protection device 23 must, corresponding to the peak value of an incorrectly wired, 24-V alternating-current voltage-leading line—taking 20% overvoltage into account—be at least 42 V.

The capacity of the capacitor Cs must not exceed the maximum permissible capacitive load for an active sensor with voltage output. The maximum permissible capacitive load is typically 20 nF.

The time constant Ri*Ci formed by the first ohmic resistor Ri and the further capacitor Ci influences the stability of the first terminal X0 configured as a voltage output. The values of the first ohmic resistor Ri and of the second capacitor Ci are to be chosen such that the time constant Ri*Ci does not exceed the value of 1 µs, as otherwise the voltage output becomes unstable.

I claim:

1. Arrangement comprising an interface component and connection points for field devices, wherein:
    the interface component includes an analog-to-digital converter, a digital-to-analog converter, a power source and a combinational circuit, through which, as required, the analog-to-digital converter, the digital-to-analog converter or the power source are each able to be automatically connected to connection points of the interface component;
    the interface component is able to be connected via a microcomputer to a digital data bus of a control and/or regulation device and a connection point for a field device containing a terminal, able to be configured via the interface component for the field device as an input and/or as an output, for bidirectional signals;
    the terminal is connected via a first ohmic resistor to a first connection point of the interface component and in that the terminal is connected via a second ohmic resistor to a second connection point of the interface component; and
    the first connection point is able to be connected via the combinational circuit to the input of the analog-to-digital converter and the second connection point via the combinational circuit to the power source, and the two ohmic resistors are not implemented in the interface component.

2. Arrangement according to claim 1, further comprising a further terminal which is connected to the signal reference point of the interface component.

3. Arrangement according to claim 2, further comprising a semiconductor overvoltage protection device connected between the two terminals and not implemented in the interface component.

4. Arrangement according to claim 2, further comprising a capacitor connected between the two terminals and not implemented in the interface component.

5. Arrangement according to claim 2, further comprising a capacitor connected between the first connection point and the signal reference point and not implemented in the interface component.

6. Apparatus according to claim 5, wherein the time constant formed by the capacitor connected between the first connection point and the signal reference point and the first ohmic resistor is one microsecond at most.

7. Arrangement according to claim 1, further comprising a scaling apparatus which is connected on the input side upstream from the analog-to-digital converter, and through which signals able to be fed to the analog-to-digital converter are able to be scaled.

8. Arrangement according to claim 1, further comprising a switch of the combinational circuit through which the power source is able to be connected to a calibrating resistor led via a connection point of the interface component, the calibrating resistor not being implemented in the interface component and the voltage lying over the calibrating resistor being able to be led via a further switch of the combinational circuit to the analog-to-digital converter.

9. Arrangement according to claim 1, further comprising a switch of the combinational circuit through which the power source is able to be connected to a calibrating resistor led via a connection point of the interface component in such a way that the calibrating resistor and also the second connection point are fed by the power source, the voltage lying over the calibrating resistor being led via a further switch of the combinational circuit to the analog-to-digital converter.

10. Arrangement according to claim 1, further comprising a voltage reference element which is able to be led via a switch of the combinational circuit to the analog-to-digital converter.

11. Arrangement according to claim 1, further comprising a sample-and-hold element connected on the input side to the output of the digital-to-analog converter and an output amplifier implemented as an operation amplifier, the sample-and-hold element being led on the output side to the non-inverting input of the output amplifier, the inverting input of the output amplifier being able to be connected via a switch to the first connection point, and the output of the output amplifier being able to be connected via a further switch of the combinational circuit to the second connection point.

12. Arrangement according to claim 1, further comprising a voltage-to-current converter connected on the input side to a third connection point of the interface component and on the output side to the first terminal and by a sample-and-hold element connected on the input side to the output of the digital-to-analog converter and also an output amplifier implemented as an operation amplifier, the sample-and-hold element being led on the output side to the non-inverting input of the output amplifier, the inverting input of the output amplifier being able to be connected via a switch and the output of the output amplifier via a further switch of the combinational circuit to the third connection point.

13. Apparatus according to claim 1, further comprising two series-connected switches, a first switch being in contact on one side with a supply voltage and the second switch on one side with a signal reference point and the joint potential of the two switches being connected to a third connection point of the interface component, with the result that the third connection point is able to be used as a digital output by driving the two switches.

14. Apparatus according to claim 1, further comprising a comparator connected on the input side to a third connection point of the interface component, with the result that the third connection point is able to be used as a digital input.

15. Apparatus according to claim 1, wherein the second ohmic resistor has a rated value in the range from 390 ohms to 1500 ohms.

16. Apparatus according to claim 15, wherein the second ohmic resistor has a rated value of 390 ohms.

17. Apparatus according to claim 1, wherein the first ohmic resistor has a rated value in the range from 10 kohms to 100 kohms.

* * * * *